(12) United States Patent
Kumagai

(10) Patent No.: US 7,213,840 B2
(45) Date of Patent: May 8, 2007

(54) OCCUPANT LEG PROTECTION APPARATUS

(75) Inventor: Masayoshi Kumagai, Shiga (JP)

(73) Assignee: Takata Corporation, Tokyo (JP)

( * ) Notice: Subject to any disclaimer, the term of this patent is extended or adjusted under 35 U.S.C. 154(b) by 279 days.

(21) Appl. No.: 10/848,502

(22) Filed: May 19, 2004

(65) Prior Publication Data

US 2004/0251665 A1  Dec. 16, 2004

(30) Foreign Application Priority Data

May 19, 2003  (JP) .............................. 2003-140632

(51) Int. Cl.
*B60R 21/045* (2006.01)
(52) U.S. Cl. .................................... 280/752
(58) Field of Classification Search ................ 280/748, 280/751, 752, 732
See application file for complete search history.

(56) References Cited

U.S. PATENT DOCUMENTS

| 5,536,043 | A | | 7/1996 | Lang et al. | |
|---|---|---|---|---|---|
| 5,630,621 | A | * | 5/1997 | Schneider | ................... 280/753 |
| 6,155,595 | A | | 12/2000 | Schultz | |
| 6,170,871 | B1 | | 1/2001 | Goestenkors et al. | |
| 6,302,437 | B1 | * | 10/2001 | Marriott et al. | ............. 280/732 |
| 6,338,501 | B1 | * | 1/2002 | Heilig et al. | ................. 280/753 |
| 6,435,554 | B1 | * | 8/2002 | Feldman | ................... 280/743.2 |
| 6,471,242 | B2 | * | 10/2002 | Schneider | ................... 280/732 |
| 6,685,217 | B2 | * | 2/2004 | Abe | ......................... 280/730.1 |
| 6,712,385 | B2 | * | 3/2004 | Enders | ..................... 280/730.1 |
| 6,916,039 | B2 | * | 7/2005 | Abe | ........................... 280/729 |
| 2002/0121770 | A1 | | 9/2002 | Schnieder | |
| 2004/0145163 | A1 | * | 7/2004 | Galmiche et al. | ......... 280/730.1 |
| 2005/0253369 | A1 | * | 11/2005 | Taoka | .......................... 280/752 |

FOREIGN PATENT DOCUMENTS

| DE | 101 47 769 | | 9/2002 |
|---|---|---|---|
| EP | 0 621 159 | | 10/1994 |
| EP | 0 684 164 | | 11/1995 |
| JP | 11-139233 | * | 5/1999 |
| WO | WO03/095272 | | 11/2003 |

* cited by examiner

*Primary Examiner*—Paul N. Dickson
*Assistant Examiner*—Drew J. Brown
(74) *Attorney, Agent, or Firm*—Manabu Kanesaka

(57) ABSTRACT

An occupant leg protection apparatus includes an airbag arranged in front of a vehicle seat, and a gas generator for inflating the airbag. An instrument panel in front of the vehicle seat has an outer layer movable toward an occupant and a base member behind the outer layer. The airbag is disposed between the outer layer and the base member so that the airbag pushes the outer layer to move toward the occupant when the airbag is inflated.

1 Claim, 6 Drawing Sheets

OCCUPANT LEG PROTECTION APPARATUS

BACKGROUND OF THE INVENTION AND RELATED ART STATEMENT

The present invention relates to an occupant leg protection apparatus for protecting leg portions of an occupant when a vehicle such as an automobile encounters a collision.

As an occupant leg protection apparatus for protecting leg portions of an occupant when a high-speed vehicle such as an automobile encounters a collision, there has been an apparatus mainly including a retainer disposed in front of a vehicle seat, an airbag accommodated in the retainer, a gas generator for inflating the airbag, and a lid for covering the retainer in a normal state (when the high-speed vehicle such as an automobile does not encounter a collision).

Japanese Patent Publication (Kokai) No. 08-40177 has disclosed an occupant leg protection apparatus in which an airbag pushes a lid to move in parallel to a vehicle seat, so that the lid receives leg portions of an occupant.

In the occupant leg protection apparatus disclosed in Japanese Patent Publication (Kokai) No. 08-40177, the airbag is accommodated in a retainer in a folded state, and one end side thereof is connected to the retainer. The lid is arranged to be flush with an interior panel in front of the vehicle seat. The lid is attached to the retainer with a fastening member. When the airbag pushes the lid, the fastening member is released so that the lid moves toward the vehicle seat.

The airbag is fixed to a backside of the lid. To restrict a distance that the lid moves, the retainer is connected to the lid with a tether. The tether is disposed inside the airbag such that one end of the tether is connected to the retainer and the other end is connected to the lid. When the airbag is inflated, the airbag pushes the lid to move forward until the tether is fully extended. The lid receives the leg portions of the occupant, and the airbag supports the lid, thereby absorbing impact of the leg portions against the lid.

In the occupant leg protection apparatus disclosed in Japanese Patent Publication (Kokai) No. 08-40177, the leg portions of the occupant collide with the lid so that the airbag behind the lid absorbs the impact. However, since the lid has certain rigidity, stress is concentrated on a portion of the legs colliding with the lid.

It is an object of the present invention to provide an occupant leg protection apparatus in which stress locally applied on leg portions of an occupant is significantly reduced.

Further objects and advantages of the invention will be apparent from the following description of the invention.

SUMMARY OF THE INVENTION

In order to attain the objects described above, according to a first aspect of the present invention, an occupant leg protection apparatus includes an airbag arranged in front of a vehicle seat, and a gas generator for inflating the airbag. An instrument panel in front of the vehicle seat has an outer layer movable toward an occupant and a base member behind the outer layer. The airbag is disposed between the outer layer and the base member so that the airbag pushes the outer layer to move toward the occupant when the airbag is inflated.

In the occupant leg protection apparatus, when the gas generator is actuated in case of a vehicle collision, the airbag arranged between the outer layer and the base member of the instrument panel is inflated so that the outer layer moves toward the occupant. The outer layer is flexible as compared to a typical instrument panel. Accordingly, even when a portion of the legs of the occupant collides with the outer layer, stress generated at the portion colliding with the outer layer is small.

According to a second aspect of the present invention, it is preferable that the outer layer is connected to the airbag and the outer layer is flexible so as to deform along a surface of the airbag facing the occupant when the airbag is inflated. The outer layer is flexible so that stress generated at a portion of the legs of the occupant colliding with the outer layer is small.

According to a third aspect of the present invention, limiting means may be provided for limiting an amount of the airbag expanding toward the occupant. It is possible to prevent the airbag from projecting too much toward the occupant when the airbag is inflated. Even when the leg portions of the occupant are located at various positions according to a posture of the occupant, the leg portions can be securely protected.

According to a fourth aspect of the present invention, the outer layer may be divided into a plurality of pieces when the airbag is inflated. Accordingly, the airbag can be deployed widely in the vertical and lateral directions when the airbag is inflated.

According to a fifth aspect of the present invention, the base member may be provided with a concavity formed in the front surface thereof so that the airbag is partially accommodated in the concavity. Accordingly, the airbag has a large inflated size.

According to a sixth aspect of the present invention, the outer layer may separate from the base member when the airbag is inflated. According to a seventh aspect of the present invention, the airbag may be designed to protrude upwardly from an upper edge of the outer layer when the airbag is inflated. Accordingly, even when the leg portion of the occupant is located at a position above the outer layer, the airbag can receive the leg portion.

According to an eighth aspect of the present invention, an occupant leg protection apparatus includes an inflatable portion arranged in front of a vehicle seat and a gas generator for inflating the inflatable portion. An instrument panel in front of the vehicle seat has an outer layer capable of expanding and a base member disposed behind the outer layer. The outer layer expands toward the occupant when gas is supplied to the outer layer from the gas generator.

In the occupant leg protection apparatus having the structure described above, the gas generator is actuated when a vehicle collides. As a result, gas is supplied between the outer layer and the base member of the instrument panel, thereby expanding the outer layer toward the occupant. Since the outer layer is formed of a flexible material as compared to a typical instrument panel, even when a portion of the legs of the occupant collides with the outer layer, only small stress is generated at the portion colliding with the outer layer.

BRIEF DESCRIPTION OF THE DRAWINGS

FIGS. 1(a) and 1(b) are views showing an occupant leg protection apparatus according to an embodiment of the present invention, wherein FIG. 1(a) is a perspective view in front of a driver seat of an automobile provided with the occupant leg protection apparatus, and FIG. 1(b) is a sectional view taken along line 1(b)—1(b) in FIG. 1(a);

DETAILED DESCRIPTION OF PREFERRED EMBODIMENTS

Figure 1A:
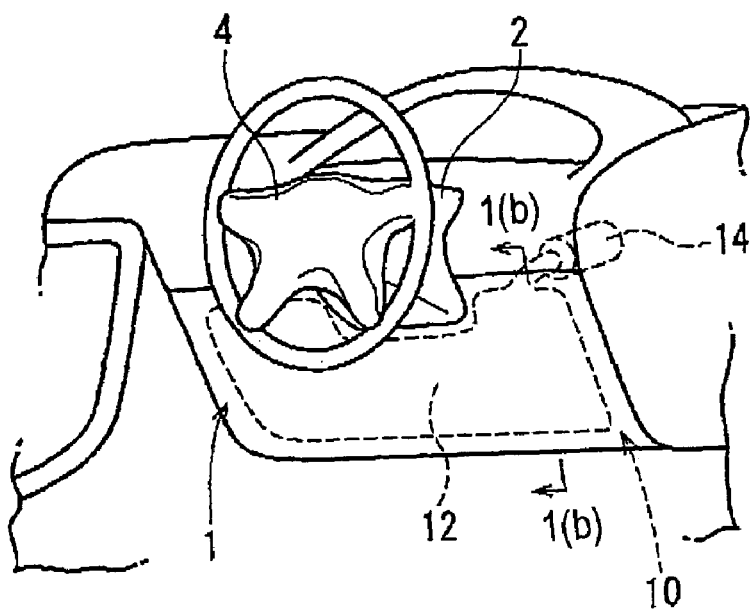
Figure 1B:
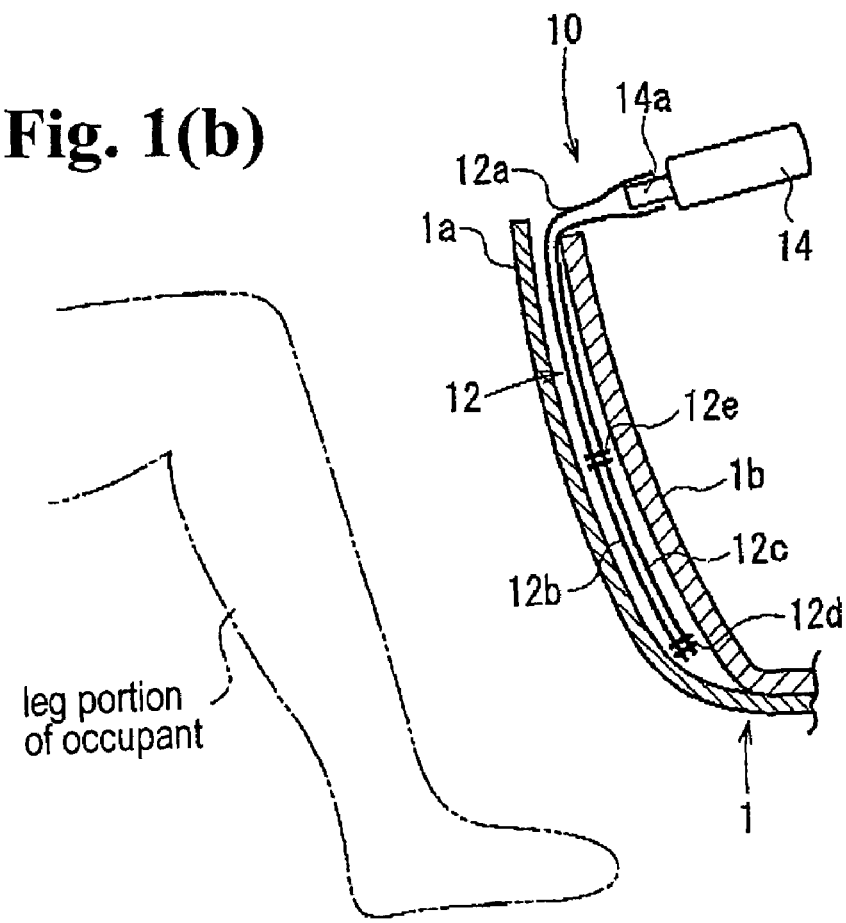
Figure 2:
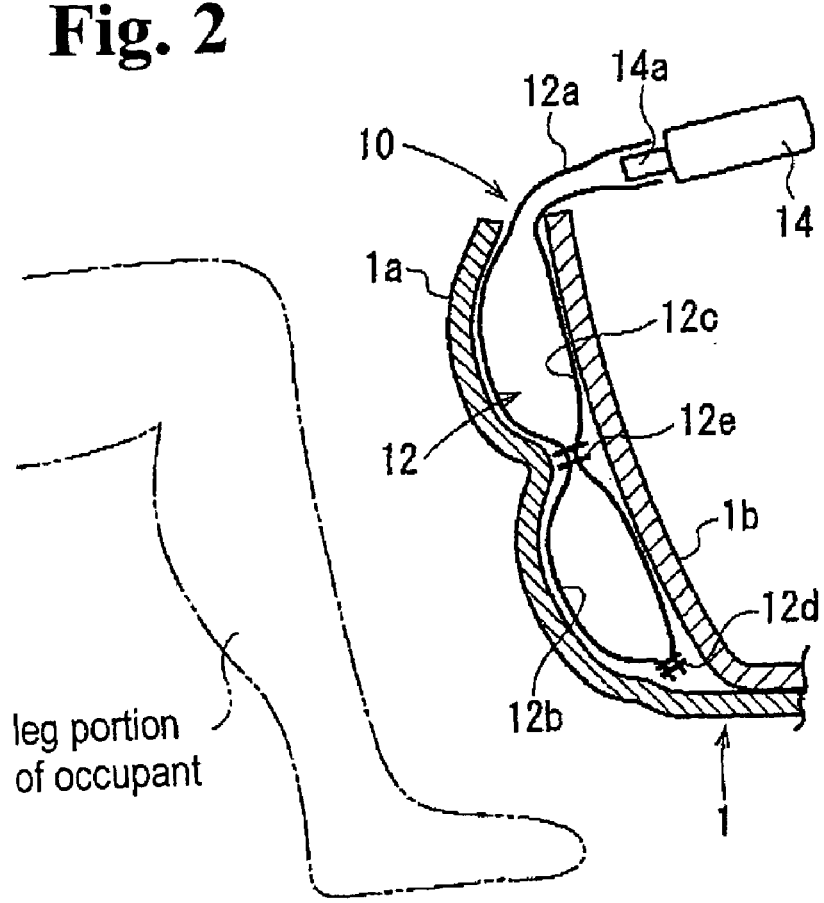
FIG. 2 is a vertical sectional view showing the occupant leg protection apparatus shown in FIG. 1(b) in a state that an airbag is inflated.

Hereunder, embodiments of the present invention will be described with reference to the attached drawings. FIGS. 1(a) and 1(b) are views showing an occupant leg protection apparatus 10 according to an embodiment of the present invention, wherein FIG. 1(a) is a perspective view in front of a driver seat of an automobile provided with the occupant leg protection apparatus, and FIG. 1(b) is a sectional view taken along line 1(b)—1(b) in FIG. 1(a). FIG. 2 is a sectional view (vertical sectional view) showing a state that an airbag is inflated similar to FIG. 1(b).

A steering column (not shown) projects from an instrument panel 1 in front of a driver seat (not shown) of an automobile. The steering column is covered by a steering column cover 2. A steering wheel 4 is fixed to an end of a steering shaft projecting from the steering column. The instrument panel has an outer layer 1a facing a vehicle cabin and a base member 1b behind the outer layer 1a. In the instrument panel 1, an airbag 12 of an occupant leg protection apparatus 10 is arranged between the outer layer 1a and the base member 1b in an area facing leg portions (lower leg portions under knees) of an occupant sitting in the driver seat. The base member 1b is a rigid member forming a skeleton of the instrument panel 1. On the other hand, the outer layer 1a is a flexible member, and can deform along a surface of the airbag 12 facing the occupant and extend in the plane direction.

The occupant lag protection apparatus 10 comprises the airbag 12, a gas generator 14 for inflating the airbag 12, and a control circuit (not shown) for actuating the gas generator 14 to eject gas in the event of an emergency such as a vehicle collision. In the normal non-emergency state, the airbag 12 is disposed between the outer layer 1a and the base member 1b in a state that the airbag 12 is folded in a flat shape as shown in FIG. 1(b). The airbag 12 has a gas introducing portion 12a formed in a hose shape extending from the airbag 12 to a backside of the base member 1b, and a gas exhaust nozzle 14a of the gas generator 14 is inserted and fixed to the gas introducing portion 12a with a hose clamp (not shown).

In this embodiment, the gas introducing portion 12a extends from an upper edge portion of the airbag 12 at one side in the lateral direction (vehicle width direction). However, the location of the gas introducing portion 12a is not limited thereto. A plurality of gas introducing portions 12a may be provided at a plurality of locations of the airbag 12. The gas generator 14 may be arranged at a location different from the location in the embodiment. The gas generator 14 may be connected to the gas introducing portion 12a via a pipe (not shown). In this case, the pipe may be arranged to supply gas from the single gas generator 14 to a plurality of gas introducing portions 12a.

In this embodiment, an outer shell of the airbag 12 is composed of a front panel 12b forming a surface facing the occupant and a rear panel 12c forming a surface opposite to the surface facing the occupant. The front panel 12b and the rear panel 12c are connected to each other around their peripheries with sewing or the like so as to form an envelope shape. Numeral reference 12d designates a seam made of a sewing thread connecting the peripheries.

The front panel 12b and the rear panel 12c are partially connected at an inner position than the peripheries. Numeral reference 12e designates a seam for the connection. Since the front panel 12b and the rear panel 12c are partially connected together at the inner position than the peripheries thereof, the outer layer is pushed out substantially uniformly over the entire area facing the leg of the occupant when the airbag 12 is inflated.

FIG. 1(b) and FIG. 2 show that the front panel 12b of the airbag 12 is separated from the outer layer 1a of the instrument panel 1, and the rear panel 12c is separated from the base member 1b for clear illustration. In the actual case, the front panel 12b contacts the outer layer 1a, and the rear panel 12c contacts the base member 1b.

When the automobile provided with the occupant leg protection apparatus 10 encounters an emergency situation such as a frontal collision, the gas generator 14 ejects gas to inflate the airbag 12. According to the inflation of the airbag 12, the outer layer 1a of the instrument panel 1, i.e. an area facing the leg portions of the occupant, moves toward the occupant. When the leg portions of the occupant move forward, a portion of the legs collides with the outer layer 1a, and the airbag 12 receives the leg portions of the occupant via the outer layer 1a, thereby absorbing impact.

In the occupant leg protection apparatus 10, the outer layer is flexible enough to deform along the surface of the airbag 12 facing the leg of the occupant when the airbag 12 is inflated, thereby reducing stress generated at a portion of the legs of the occupant colliding with the outer layer 1a.

In the embodiment, the front panel 12b and the rear panel 12c of the airbag 12 are partially connected together at the inner position than the peripheries thereof. Accordingly, the outer layer 1a is pushed out substantially uniformly over the entire area facing the leg of the occupant. Therefore, even when positions of the leg portions of the occupant vary widely according to a posture of the occupant, the leg portions can be securely protected.

Figure 3:
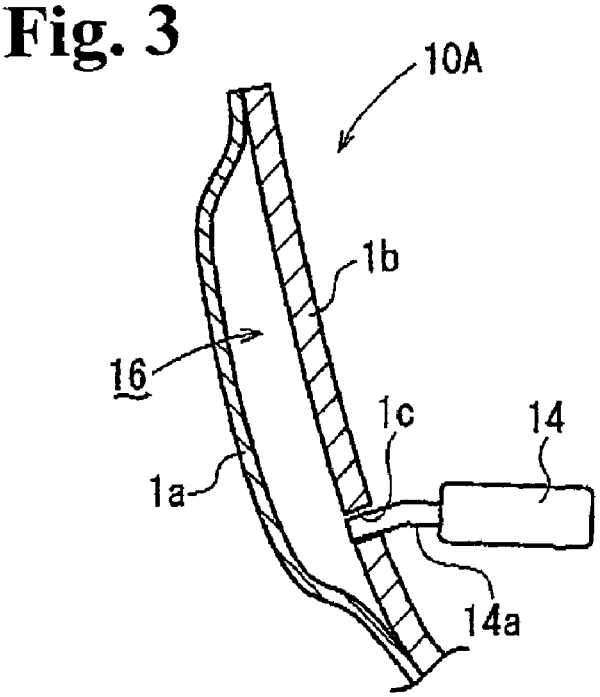
FIG. 3 is a vertical sectional view of an occupant leg protection apparatus according to another embodiment of the present invention in a state that an outer layer of an instrument panel expands.

In the embodiment, the airbag 12 is arranged between the outer layer 1a and the base member 1b of the instrument panel 1, and the outer layer 1a is pushed out by the airbag to move toward the occupant when the airbag 12 is inflated. The occupant leg protection apparatus may have such a structure that the outer layer 1a expands toward the occupant when gas is supplied between the outer layer 1a and the base member 1b, as an occupant leg protection apparatus 10A shown in FIG. 3. FIG. 3 is a vertical sectional view showing the occupant leg protection apparatus 10A having such a structure in a state that an outer layer of an instrument panel expands.

In the occupant leg protection apparatus 10A shown in FIG. 3, the outer layer 1 expands toward the occupant sitting in the driver seat in an area of an instrument panel facing the leg portions of the occupant. A peripheral edge of the outer layer 1a facing the occupant is air-tightly connected to the base member 1b, and a chamber 16 is formed and defined by the outer layer 1a and the base member 1b at the area. The base member 1b is provided with an opening 1c communicating with the chamber 16. A gas exhaust nozzle 14a of the gas generator 14 is connected to the opening 1c. In the normal state, no gas is introduced into the chamber 16 so that the cuter layer 1 contacts the base member 1b.

In this embodiment, the base member 1b is a rigid member forming a skeleton of the instrument panel 1. The outer layer 1a is a flexible member, and can deform and extend in the plane direction to expand toward the occupant by the pressure of gas. The other structure of the occupant leg protection apparatus 10A is the same as that of the occupant leg protection apparatus 10 shown in FIGS. 1(a), 1(b) and 2. The same numerals used in FIG. 3 designate the same parts in FIGS. 1(a), 1(b) and 2.

In the occupant leg protection apparatus 10A having the structure described above, in the event of an emergency such as a vehicle frontal collision, the gas generator 14 is actuated to eject gas so that the gas is supplied into the chamber 16, so that the cuter layer 1a expands toward the occupant in an area of the instrument panel 1 facing the leg portions of the occupant. When the leg portions of the occupant move forward, the leg portions collide with the outer layer 1a and the leg portions of the occupant are received by gas pressure inside the chamber 16, thereby absorbing impact. Also, since the outer layer 1a is flexible, stress generated at a portion of the legs of the occupant colliding with the outer layer 1a is reduced. Further, the airbag is not provided for pushing the outer layer 1a toward the occupant, thereby making the occupant leg protection apparatus 10A simple.

Figure 4:
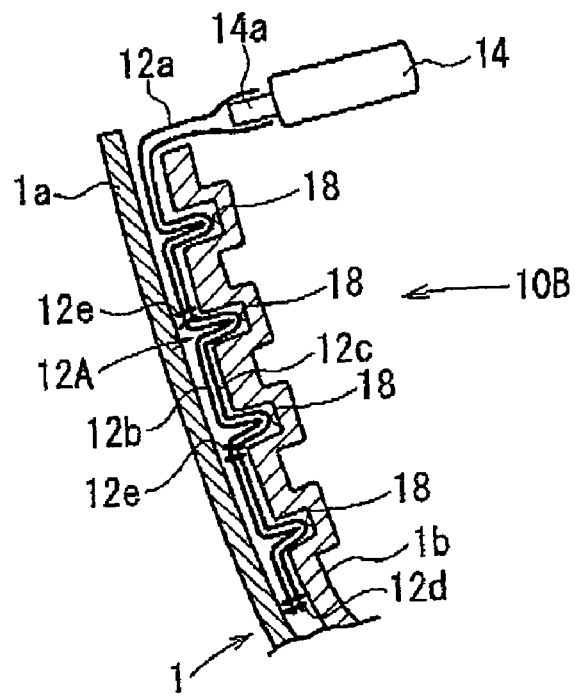
FIG. 4 is a vertical sectional view of an occupant leg protection apparatus according to a further embodiment of the present invention.
Figure 5:
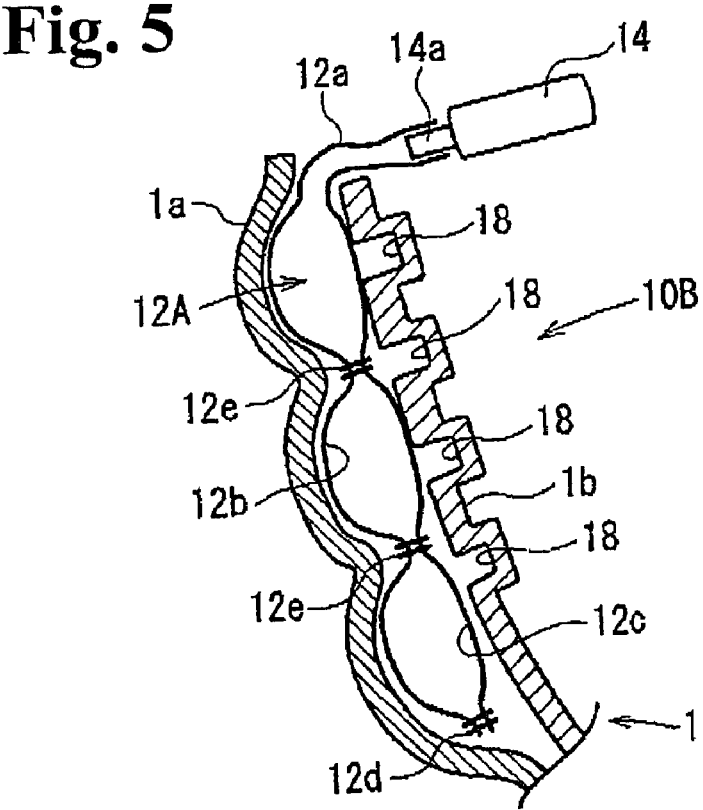
FIG. 5 is a vertical sectional view showing the occupant leg protection apparatus shown in FIG. 4 in a state that an airbag is inflated.

FIG. 4 is a vertical sectional view showing an occupant leg protection apparatus 10B according to another embodiment of the present invention in a state that an airbag is not inflated. FIG. 5 is a vertical sectional view showing the occupant leg protection apparatus 10B in a state that the airbag is inflated. In the occupant leg protection apparatus 10B, similar to the occupant leg protection apparatus 10 shown in FIGS. 1(a), 1(b) and 2, an airbag 12A is arranged between the outer layer 1a and the base member 1b at an area of the instrument panel 1 facing the leg of the occupant. The gas exhaust nozzle 14a of the gas generator 14 is connected to the gas introducing portion 12a extending from the airbag 12A to the backside of the base member 1b. The airbag 12A is designed to expand in a wider area than the area of the outer layer 1a facing the leg of the occupant in the normal state in the vertical direction and the lateral direction.

The base member 1b provided with the airbag 12A has concavities in the front surface thereof with intervals in the vertical direction and the lateral direction for retaining the airbag 12A. The airbag 12A is folded in a flat shape along an entire surface of the base member 1b, and is folded in pleats placed in the respective concavities 18 at portions corresponding to the respective concavities 18. In this manner, the airbag is folded in a shape without protruding from the outer layer 1a.

The outer layer 1a is a flexible member to deform along the surface of the airbag 12A facing the occupant when the airbag 12A is inflated, and extends in the plane direction when the airbag 12A deploys in the vertical direction and the lateral direction. Similar to FIGS. 1(a), 1(b) and 2, FIGS. 4 and 5 show that the front panel 12b of the airbag 12A is separated from the outer layer 1a of the instrument panel 1 and the rear panel 12c of the airbag 12A is separated from the base member 1b of the instrument panel 1 for clear illustration. In the actual case, the front panel 12b contacts the outer layer 1a and the rear panel 12c contacts the base member 1b. The other structure of the occupant leg protection apparatus 10B is the same as that of the occupant leg protection apparatus 10 shown in FIGS. 1(a), 1(b) and 2. The same numerals used in FIGS. 4 and 5 designate the same parts in FIGS. 1(a), 1(b) and 2.

In the occupant leg protection apparatus 10B having structure described above, in the event of an emergency such as a vehicle frontal collision, the gas generator 14 is actuated to eject gas so that the gas is supplied to the inside of the airbag 12A. Accordingly, the airbag 12A is inflated and the outer layer 1a expands toward the occupant. When the leg portions of the occupant move forward, the leg portions collide with the outer layer 1a and the airbag 12A receives the leg portions via the outer layer 1a, thereby absorbing impact. The outer layer 1a is flexible, thereby reducing stress generated at the portion of the legs of the occupant colliding with the outer layer 1a. It is possible to deploy the airbag 12A into a wider area in the vertical direction and the lateral direction.

Figure 6:
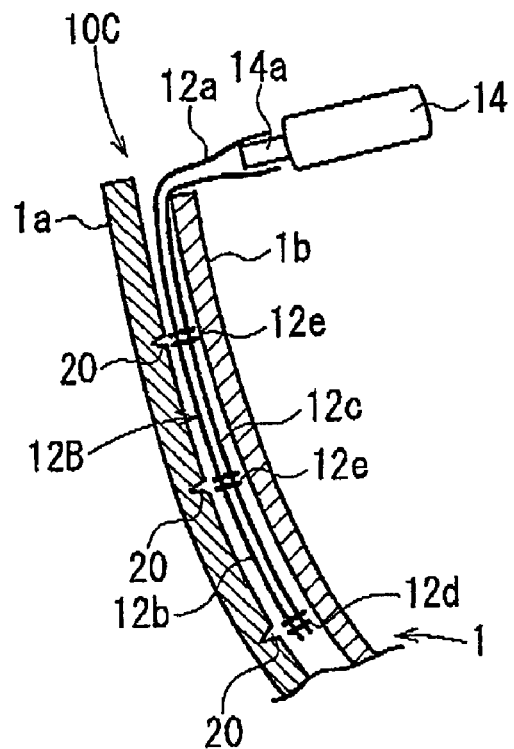
FIG. 6 is a vertical sectional view of an occupant leg protection apparatus according to a still further embodiment of the present invention.
Figure 7:
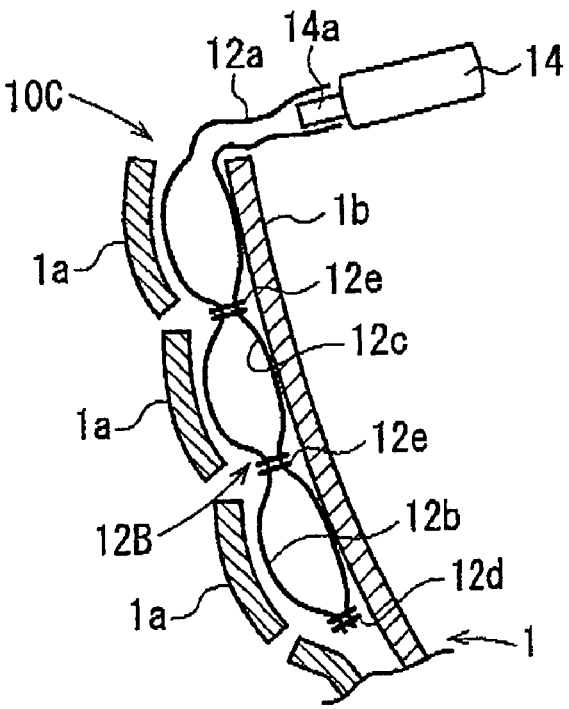
FIG. 7 is a vertical sectional view showing the occupant leg protection apparatus shown in FIG. 6 in a state that an airbag is inflated.

FIG. 6 is a vertical sectional view showing an occupant leg protection apparatus 10C according to a further embodiment of the present invention in a state that an airbag is not inflated. FIG. 7 is a vertical sectional view showing the occupant leg protection apparatus 10C in a state that the airbag is inflated. In the occupant leg protection apparatus 10C, similar to the occupant leg protection apparatus 10 shown in FIGS. 1(a), 1(b) and 2, an airbag 12B is arranged between the outer layer 1a and the base member 1b at an area of the instrument panel 1 facing the leg of the occupant. The gas exhaust nozzle 14a of the gas generator 14 is connected to the gas introducing portion 12a extending from the airbag 12B to the backside of the base member 1b. In this embodiment, the airbag 12B is designed not to protrude from the area of the outer layer 1a facing the leg of the occupant in a state that the airbag 12B is folded in a flat shape. When the airbag is inflated, the front panel 12b and the rear panel 12c composing the outer shell of the airbag expand in the vertical direction and the lateral direction into a wider area than the area of the outer layer facing the leg of the occupant.

Similar to FIGS. 1(a), 1(b) and 2, FIGS. 6 and 7 show that the front panel 12b is separated from the outer layer 1a for clear illustration. In the actual case, the front panel 12b is connected to the outer layer 1a with connecting means such as adhesive bonding. FIGS. 6 and 7 also show that the rear panel 2c is separated from the base member 1b. In the actual case, they contact with each other.

In this embodiment, the outer layer 1a is a flexible member to deform along the surface of the airbag 12B facing the occupant with little or no expansion in the plane direction when the airbag 12B is inflated. The outer layer 1a is provided with a plurality of tear lines 20 spaced apart from each other in the vertical direction and the lateral direction.

The tear lines 20 extend in the lateral direction and the vertical direction and intersect with each other. When the airbag 12B is inflated, the outer layer 1a is divided along the tear lines 20 into a plurality of pieces according to the expansion of the front panel 12b in the vertical direction and the lateral direction, thereby expanding the front panel 12b. The other structure of the occupant leg protection apparatus 10C is the same as that of the occupant leg protection apparatus 10 shown in FIGS. 1(a), 1(b) and 2. The same numerals used in FIGS. 6 and 7 designate the same parts in FIGS. 1(a), 1(b) and 2.

In the occupant leg protection apparatus having the structure described above, in the event of an emergency such as a vehicle frontal collision, the gas generator 14 is actuated to eject gas so that the gas is supplied into the inside of the airbag 12B, thereby inflating the airbag 12B to push the outer layer 1a toward the occupant. At this time, the outer layer 1a is divided along the tear lines 20 according to the inflation of the airbag 12B so that the airbag 12B expands widely in the vertical direction and the lateral direction. In the occupant leg protection apparatus 10C, the outer layer 1a is flexible, thereby reducing stress generated at a portion of the legs of the occupant colliding with the outer layer.

In the occupant leg protection apparatus 10C, the outer layer 1a is divided into a plurality of pieces, so that the airbag 12B deploys into a wider area in the vertical direction and the lateral direction. Since the outer layer 1a is designed to be divided into a plurality of pieces, material having poor extensibility in the plane direction can be employed for forming the outer layer 1a, thereby making it possible to use a wide variety of materials.

Figure 8:
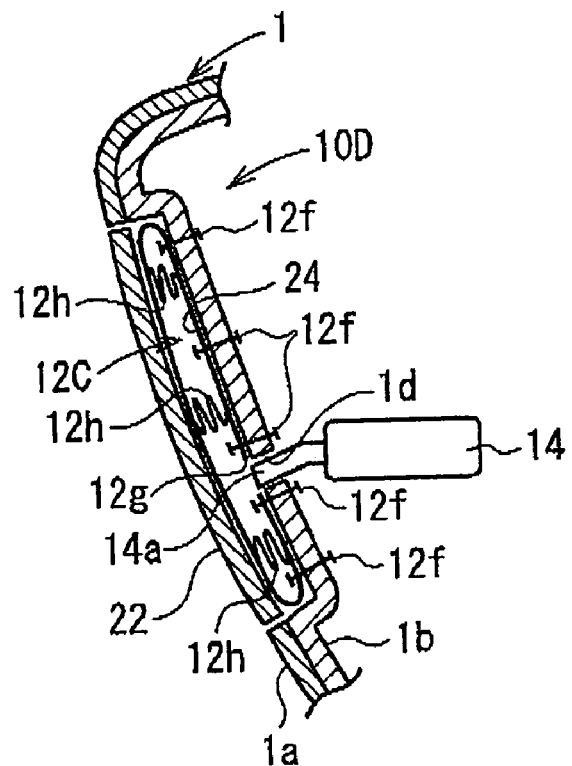
FIG. 8 is a vertical sectional view showing an occupant leg protection apparatus according to a still further embodiment of the present invention.
Figure 9:
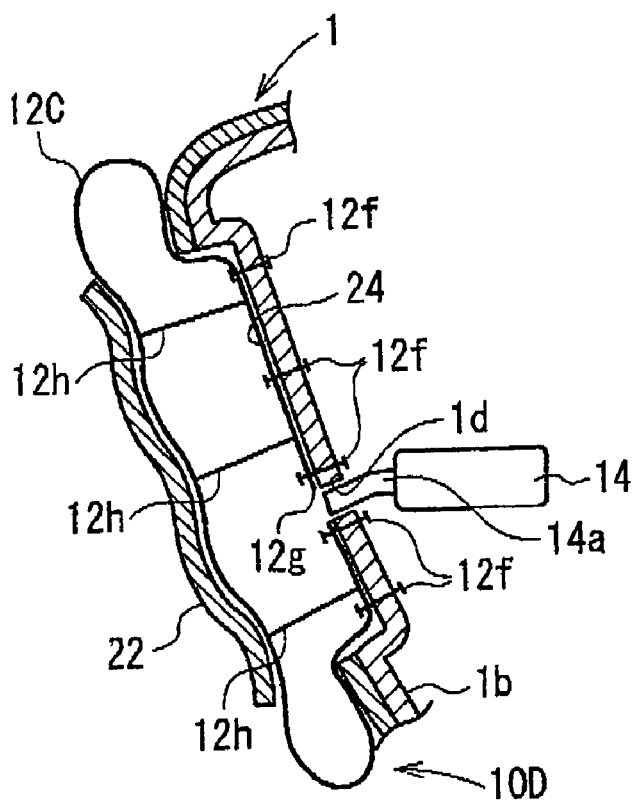
FIG. 9 is a vertical sectional view showing the occupant leg protection apparatus shown in FIG. 8 in a state that an airbag is inflated.

FIG. 8 is a vertical sectional view showing an occupant leg protection apparatus 10D according to a still further embodiment in a state that an airbag is not inflated. FIG. 9 is a vertical sectional view showing the occupant leg protection apparatus 10D in a state that the airbag is inflated. In this embodiment, the outer layer 1a of the instrument panel 1 has a portion 22 facing the leg of the occupant, and the portion 22 can be separated from the other portion around the portion 22. The base member 1b disposed behind the outer layer 1a is provided with an airbag housing portion 24 at an area corresponding to the portion 22. The airbag housing portion 24 is composed of a convexity formed in a front surface of the base member 1b. An airbag 12C is accommodated in the airbag housing portion 24 in a state that the airbag 12C is folded flatly. The airbag 12C can be deployed into a wider area than the portion 22 in the vertical direction and the lateral direction. The portion 22 (outer layer 1a) is a flexible member to deform along the surface of the airbag 12C facing the occupant when the airbag 12C is inflated.

The occupant leg protection apparatus 10D comprises the airbag 12C and the gas generator 14 for inflating the airbag 12C. A rear surface of the airbag 12C is attached to a bottom of the airbag housing portion 24 with fastening members 12f such as rivets. The rear surface of the airbag 12C is provided with an opening 12g for introducing gas. The bottom of the airbag housing portion 24 is provided with an opening communicating with the opening Id. The gas exhaust nozzle 14a of the gas generator 14 is connected to the opening 1d.

In the embodiment, the airbag 12C is provided inside thereof with tethers (straps) 12h connecting the surface facing the leg of the occupant and the rear surface of the airbag 12C with intervals in the vertical direction and the lateral direction. The tethers 12h limit the bulging amount of the surface facing the leg of the occupant toward the occupant when the airbag 12C is inflated, thereby preventing the airbag 12C from locally projecting.

Similar to FIGS. 1(a), 1(b) and 2, FIGS. 8 and 9 show that the surface of the airbag 12C facing the leg of the occupant is separated from the portion 22 of the outer layer 1a facing the leg of the occupant, and the rear surface of the airbag 12C is separated from the bottom of the airbag housing portion 24 for clear illustration. In the actual case, the surface of the airbag 12C facing the leg of the occupant is connected to the portion 22 of the outer layer 1a facing the leg of the occupant with adhesive bonding or the like, and the rear surface of the airbag 12C contacts the bottom of the airbag housing portion 24.

The portion 22 of the outer layer 1a facing the leg of the occupant is formed as a member separate from the other portion of the outer layer 1a around the portion 22 of the outer layer 1a facing the leg of the occupant in FIGS. 8 and 9, and they may be formed integrally. In this case, the portion 22 of the outer layer 1a facing the leg of the occupant and the outer layer 1a are defined by tear lines or the like (not shown). The other structure of the occupant leg protection apparatus 10D is the same as that of the occupant leg protection apparatus 10 shown in FIGS. 1(a), 1(b) and 2. The same numerals used in FIGS. 8 and 9 designate the same parts in FIGS. 1(a), 1 and 2.

In the occupant leg protection apparatus 10D having the structure described, in the event of an emergency such as a vehicle frontal collision, the gas generator 14 is actuated to eject gas so that the gas is supplied to the inside of the airbag 12C, thereby inflating the airbag 12C. According to the inflation of the airbag 12C, the portion 22 facing the leg of the occupant separates from the portion around the portion 22 of the outer layer 1a facing the leg of the occupant, and moves toward the occupant. The airbag 12C expands widely in the vertical direction and the lateral direction to protrude from the portion 22 facing the leg of the occupant. Also, the portion 22 facing the leg of the occupant (outer layer 1a) is flexible. Accordingly, even when a portion of the legs of the occupant collides with the portion 22, stress generated at the portion colliding the occupant leg-facing portion 22 is enough small.

In the occupant leg protection apparatus 10D, the portion 22 of the outer layer 1a facing the leg of the occupant is separable from the portion around the portion 22 facing the leg of the occupant. Accordingly, the airbag 12C can be deployed into a wider area than the portion 22 facing the leg of the occupant in the vertical direction and the lateral direction. Therefore, even when the leg portion of the occupant is located at any position above or below, right or left side of the portion 22 facing the leg of the occupant, the leg portion can be received by the airbag 120.

Figure 10:
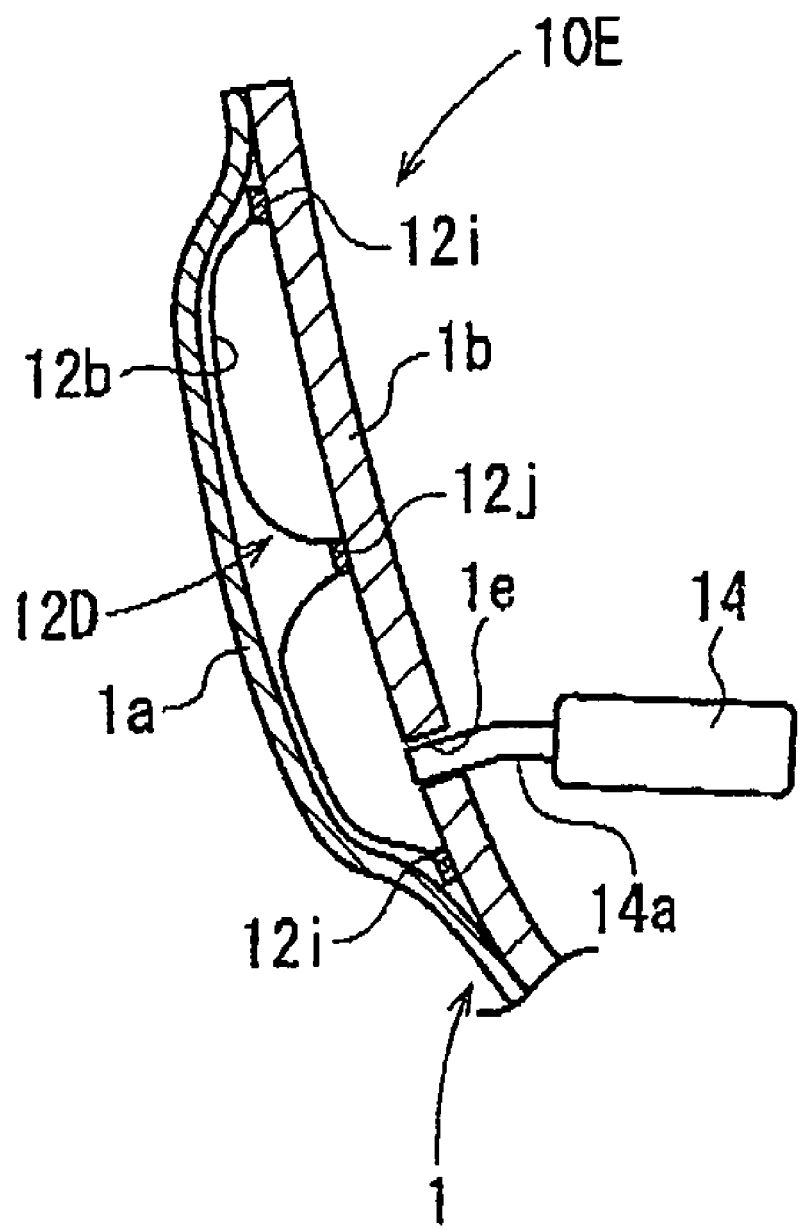
FIG. 10 is a vertical sectional view of an occupant leg protection apparatus according to a still further embodiment of the present invention.

According to the present invention, the airbag arranged between the outer layer and the base member of the instrument panel may be connected to the base member. In this case, the surface (outer shall) opposite to the surface of the airbag facing the occupant may be composed of the base member, just like an occupant leg protection apparatus 10E shown in FIG. 10. FIG. 10 is a vertical sectional view showing the occupant leg protection apparatus having the above structure in a state that the airbag is inflated.

In the occupant leg protection apparatus 10E shown in FIG. 10, an airbag 12D arranged between the outer layer 1a and the base member 1b of the instrument panel 1 has an outer shell formed of a front panel 12b facing the occupant and an area of the base member 1b behind the front panel 12b. That is, the peripheral edge of the front panel 12b is air-tightly connected to the base member 1b. When gas is supplied between the front panel 12b and the base member 1b, the front panel 12b expands toward the occupant. Reference numeral 12i designates an adhesive layer connecting the peripheral edge of the front panel 12b to the base member 1b. In this embodiment, the front panel 12b is further connected locally to the base member 1b at an inner position than the periphery thereof, thereby limiting the bulging amount of the front panel 12b toward the occupant.

In this embodiment, the base member 1b is provided with an opening 1e communicating with a space between the front panel 12b and the base member 1b. The gas exhaust nozzle 14a of the gas generator 14 is connected to the opening 1e. The outer layer 1a of the instrument panel is a flexible member to deform along the front panel 12b and extend in the vertical direction and lateral direction according to the bulging of the front panel 12b.

Similar to FIGS. 1(a), 1(b) and 2, FIG. 10 shows that the front panel 12b of the airbag 12D is separated from the outer layer 1a of the instrument panel 1 for clear illustration. In the actual case, the front panel 12b contacts the outer layer 1a. The other structure of the occupant leg protection apparatus 10E is the same as that of the occupant leg protection apparatus 10 shown in FIGS. 1(a), 1(b) and 2. The same numerals used in FIG. 10 designate the same parts in FIGS. 1(a), 1(b) and 2.

In the occupant leg protection apparatus 10E having the structure described above, in the event of an emergency such as a vehicle frontal collision, the gas generator 14 is actuated to eject gas so that the gas is supplied between the front panel 12b and the base member 1b, thereby expanding the front panel 12b to push the outer layer 1a of the instrument panel 1 toward the occupant. When the leg portions of the occupant move forward, the leg portions collide with the outer layer 1a and the airbag 12D receives the leg portions via the outer layer 1a, thereby absorbing impact. Also, the outer layer 1a is flexible, thereby reducing stress generated at a portion of the legs of the occupant colliding with the outer layer 1a.

In the occupant leg protection apparatus 10E, the airbag 12D is formed by attaching the peripheral edge of the front panel 12b to the base member 1b with the adhesive layer 12i, thereby making the assembling operation simple.

The embodiments described above are just examples of the present invention. It should be understood that the present invention may include embodiments other than the embodiments described above. For example, the present invention is applied to the embodiments of the occupant leg protection apparatus for the occupant sitting in a driver seat. The present invention may be applied to an occupant leg protection apparatus for an occupant sitting in another seat.

As described above, the present invention provides an occupant leg protection apparatus capable of significantly reducing stress locally generated at a portion of the legs of the occupant.

While the invention has been explained with reference to the specific embodiments of the invention, the explanation is illustrative and the invention is limited only by the appended claims.

What is claimed is:

1. An occupant leg protection apparatus for protecting an occupant in a vehicle seat, comprising:
    an instrument panel disposed in front of the vehicle seat and having an outer layer movable toward the occupant and a base member arranged behind the outer layer,
    an airbag to be inflated in front of the vehicle seat and disposed between the outer layer and the base member of the instrument panel so that the airbag pushes the outer layer toward the occupant when the airbag is inflated, said airbag having a front panel contacting the outer layer and a rear panel contacting the base member, said front panel and rear panel being partially connected together in a middle area thereof to regulate a shape thereof when the airbag is inflated, and
    a gas generator for inflating the airbag,
    wherein said outer layer is flexible and deformable so that when the airbag is inflated, the outer layer is deformed along the front panel of the airbag to receive impact together with the airbag,
    wherein said outer layer includes sections so that the outer layer is divided into a plurality of pieces when the airbag is inflated.

* * * * *